United States Patent
Mathews

(10) Patent No.: US 7,597,127 B2
(45) Date of Patent: Oct. 6, 2009

(54) TIRE WITH TREAD INCLUDING CIRCUMFERENTIAL GROOVES HAVING GENERALLY SINUSOIDAL CONTOUR

(75) Inventor: Daniel Stephen Mathews, Mount Vernon, IL (US)

(73) Assignee: Continental AG, Hannover (DE)

( * ) Notice: Subject to any disclaimer, the term of this patent is extended or adjusted under 35 U.S.C. 154(b) by 393 days.

(21) Appl. No.: 11/276,785

(22) Filed: Mar. 14, 2006

(65) Prior Publication Data

US 2007/0151644 A1 Jul. 5, 2007

Related U.S. Application Data

(60) Provisional application No. 60/754,638, filed on Dec. 30, 2005.

(51) Int. Cl.
*B60C 11/04* (2006.01)
*B60C 11/13* (2006.01)

(52) U.S. Cl. .............. 152/209.18; 152/209.21; 152/209.24; 152/900; 152/DIG. 1

(58) Field of Classification Search ............ 152/209.18, 152/209.21, 209.24, 900, DIG. 1
See application file for complete search history.

(56) References Cited

U.S. PATENT DOCUMENTS

| | | | |
|---|---|---|---|
| D112,978 S | 1/1939 | James | |
| 2,239,070 A | 4/1941 | Overman et al. | |
| 2,843,172 A | 7/1958 | Berry et al. | |
| 2,938,560 A | 5/1960 | Wallace et al. | |
| D191,778 S | 11/1961 | Hawkinson | |
| 3,055,410 A | 9/1962 | Caulkins | |
| 3,951,193 A * | 4/1976 | Yeager | 152/900 |
| D239,767 S | 5/1976 | Yahagi et al. | |
| RE30,527 E * | 2/1981 | Verdier | 152/900 |
| 4,630,661 A * | 12/1986 | Stelzer | 152/900 |
| D317,427 S | 6/1991 | Enoki et al. | |
| 5,099,899 A | 3/1992 | Takeuchi | |
| 5,154,216 A | 10/1992 | Ochiai et al. | |
| 5,246,049 A | 9/1993 | Ramcke et al. | |
| 5,535,798 A | 7/1996 | Nakamura | |
| D382,235 S | 8/1997 | Nelson | |
| D390,170 S | 2/1998 | Stone et al. | |
| D399,460 S | 10/1998 | Albert | |
| 5,896,905 A * | 4/1999 | Lurois | 152/900 |
| 5,924,464 A | 7/1999 | White | |
| D451,860 S | 12/2001 | Schuster et al. | |
| D457,127 S | 5/2002 | Warchol | |

(Continued)

FOREIGN PATENT DOCUMENTS

EP 256247 * 2/1988

(Continued)

OTHER PUBLICATIONS

U.S. Appl. No. 11/320,849, filed Dec. 30, 2005.

(Continued)

*Primary Examiner*—Steven D Maki
(74) *Attorney, Agent, or Firm*—Greenblum & Bernstein P.L.C.

(57) ABSTRACT

Tire having a tread pattern with superior performance characteristics. The tread pattern includes ribs and circumferential grooves which are at least one of tapered and/or generally V-shaped. The walls of each circumferential groove have a wavy and/or sinusoidal contour extending in a generally circumferential direction.

2 Claims, 10 Drawing Sheets

U.S. PATENT DOCUMENTS

| | | |
|---|---|---|
| 6,412,531 B1 | 7/2002 | Janajreh |
| 6,415,835 B1 | 7/2002 | Heinen |
| 6,488,064 B1 * | 12/2002 | Radulescu ............. 152/209.18 |
| 6,609,548 B2 | 8/2003 | Kousaie et al. |
| D500,287 S | 12/2004 | Gojo |
| 2002/0092591 A1 * | 7/2002 | Cortes ................... 152/209.18 |
| 2003/0047262 A1 | 3/2003 | Kousaie et al. |
| 2007/0151645 A1 * | 7/2007 | Mathews .................... 152/900 |

FOREIGN PATENT DOCUMENTS

| | | | |
|---|---|---|---|
| EP | 0680837 | | 12/1998 |
| GB | 525466 | | 2/1939 |
| GB | 1189445 | | 8/1967 |
| JP | 58-177703 | * | 10/1983 |
| JP | 59-124412 | * | 7/1984 |
| JP | 60-197409 | * | 10/1985 |
| JP | 62-015103 | * | 1/1987 |
| JP | 09-011708 | * | 1/1997 |
| JP | 2004-161166 | * | 6/2004 |
| JP | 2005-112085 | * | 4/2005 |

OTHER PUBLICATIONS

U.S. Appl. No. 11/311,330, filed Dec. 20, 2005.

* cited by examiner

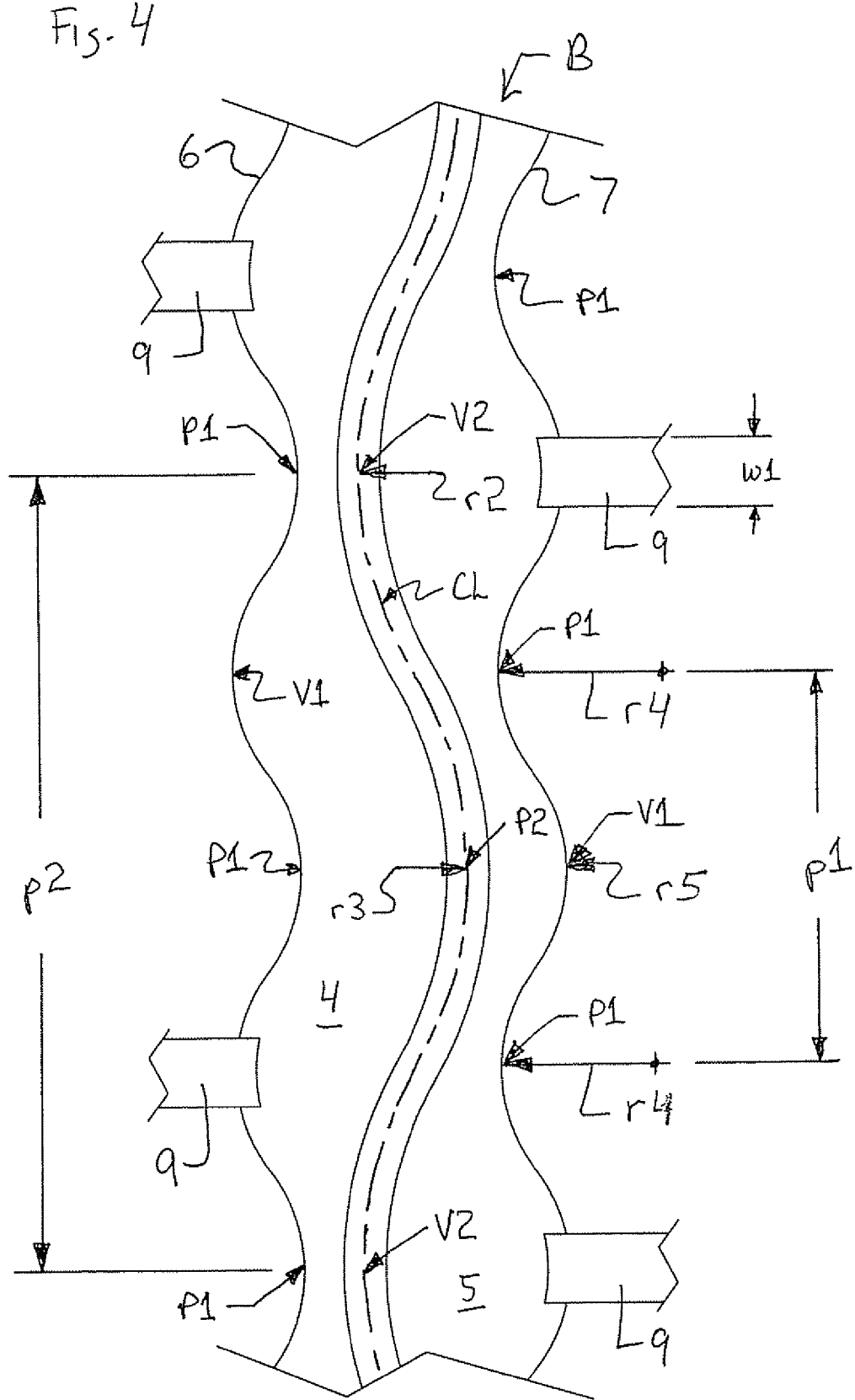

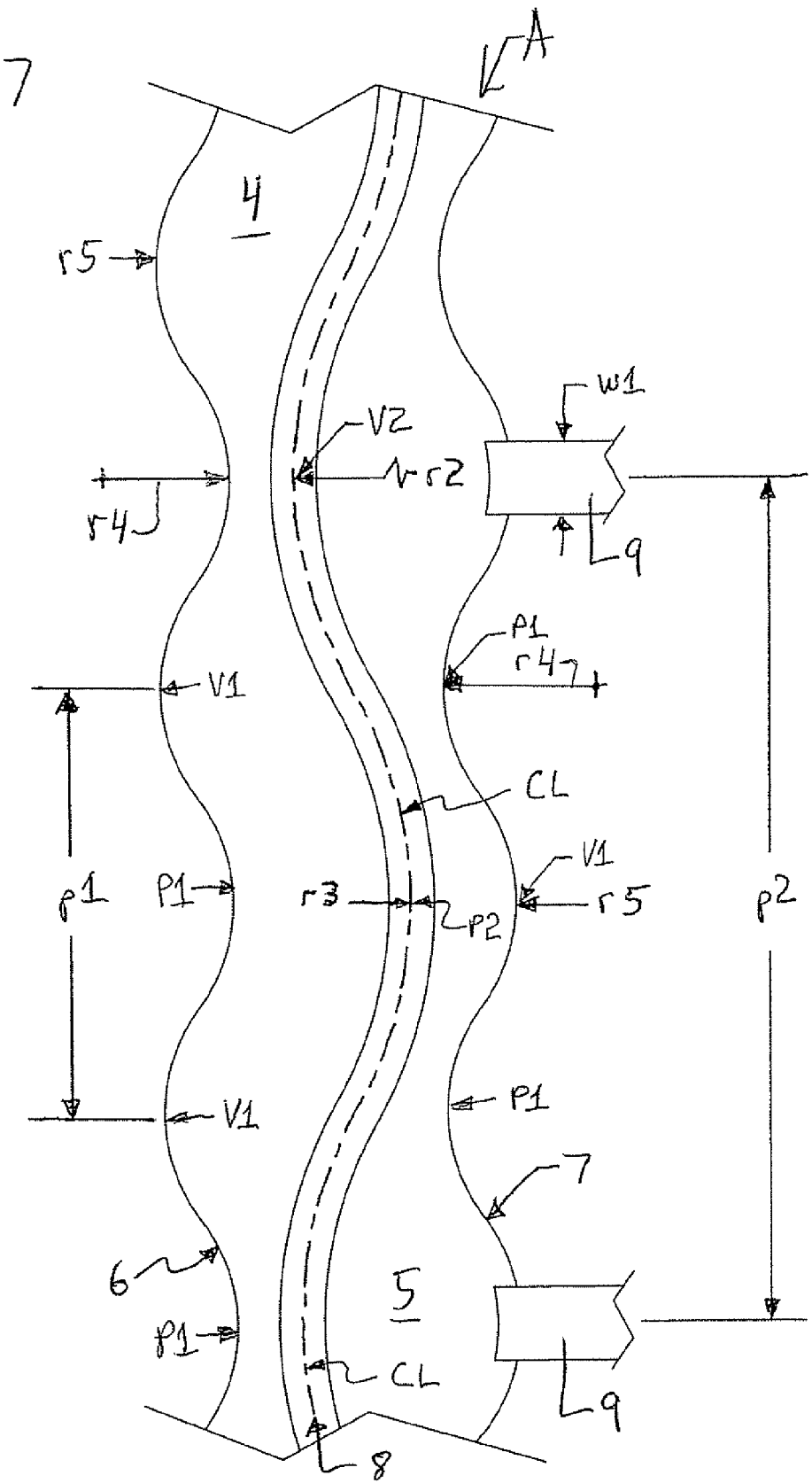

TIRE WITH TREAD INCLUDING CIRCUMFERENTIAL GROOVES HAVING GENERALLY SINUSOIDAL CONTOUR

CROSS-REFERENCE TO RELATED APPLICATIONS

The present application claims the benefit of U.S. Provisional Patent Application No. 60/754,638, filed on Dec. 30, 2005 under 35 U.S.C. §119(e), the disclosure of which is expressly incorporated by reference herein in its entirety.

FIELD OF THE INVENTION

The invention generally relates to a pneumatic tire having a tread pattern and, more particularly, to a pneumatic tire for a vehicle having a tread pattern that provides superior performance characteristics.

BACKGROUND OF INVENTION

Tire design and more specifically tread pattern design plays a critical role in the safe and efficient operation of a vehicle. For example, it is known that the tread pattern assists in the generation of steering forces, as well as driving and braking forces. Also, the tread pattern can improve vehicle performance by reducing road noise, providing superior grip capabilities in both wet and/or dry driving conditions, as well as minimizing rolling resistance to increase the overall fuel economy of the vehicle.

In examining the complex mechanisms involved in proper tread pattern design, several factors play a role in the final design of the tread pattern. These factors include industry standards, government regulations, customer specifications, marketing requirements and the like. On the other hand, the complex mechanisms which are taken into account in the design of the tread pattern include, amongst other mechanisms, stresses generated upon the tire during driving conditions, energy losses due to rolling resistance, sidewall flexing, to a host of other mechanisms. Thus, the design of a tread pattern is not a trivial task and, in fact, is quite complex requiring the need to take into account many different considerations.

In practice, the design of a tire tread pattern also requires the balancing of many contradictory demands. Finding the proper structure that balances these demands for any given tire is thus a great challenge. For this and other reasons, engineers typically focus on a large array of considerations, placing emphasis on certain design criteria over others, depending on the specific application of the tire. However, by focusing on certain design criteria, other criteria such as tire wear or stress components may not have been weighed as heavily during the design stage.

By way of a more specific illustration, one design approach has been to form grooves between ribs with negatively sloped walls to increase gripping capabilities. However, in such an approach, the grooves are more likely to trap and retain stones, which can damage the tire. Another example is in the use of all-season tires, which customarily employ block elements in their tread design. These designs have superior grip performance but tend to have increased noise level, as well as have a tendency toward irregular wear due primarily to their lack of stiffness in the circumferential direction of the tread. Such noise generation and irregular wear are accentuated at acute or sharp angles in the rubber blocks formed by intersections of groove walls.

In any event, tire patterns have common pattern traits. These common pattern traits include, for example, grooves with sharp or acute angles in transitional areas, e.g., between treads, vertical walls forming the grooves or treads, etc. It has been theorized that such designs have large stress components which conjugate at the sharp angles, as well as result in increased road noise and rolling resistance. Of course, engineers are constantly designing tread patterns to increase overall tire efficiency, but these design traits remain pervasive.

SUMMARY OF THE INVENTION

In a first aspect of the invention, a tire comprises a tread pattern with straight circumferential grooves each having groove walls or rib walls which are tapered and/or generally V-shaped. The tapered walls also have a generally sinusoidal contour or configuration extending in the circumferential direction. The groove opening edges of each of the circumferential grooves have a generally sinusoidal configuration.

In another aspect of the invention, the tire may further include at least one of each of the circumferential grooves having a straight groove opening and being devoid of sharp corners and each of the walls having a variable wall contour.

In another aspect of the invention, each of the circumferential grooves may have an inwardly curved groove base whose depth is substantially constant in the generally circumferential direction.

In another aspect of the invention, each of the circumferential grooves may comprise an inwardly curved groove base having at least one of a wavy contour and a sinusoidal contour extending in the generally circumferential direction.

In another aspect of the invention, the groove opening edges of each of the circumferential grooves may include non-circumferentially aligned inwardly curved portions.

In another aspect of the invention, the groove opening edges of each of the circumferential grooves may include non-circumferentially aligned outwardly curved portions.

In another aspect of the invention, at least one of the circumferential grooves may include a generally sinusoidal groove base, a pitch length of the sinusoidal groove base being at least one of twice a pitch length of the sinusoidal configuration of at least one of the groove opening edges and greater than a pitch length of the generally sinusoidal configuration of at least one of the groove opening edges.

In another aspect of the invention, at least one of the circumferential grooves may include a wavy groove base that travels circumferentially and laterally crosses over a theoretical center line located between the groove opening edges of the one of the at least one circumferential grooves.

In another aspect of the invention, at least one of the circumferential grooves may include a groove base that travels circumferentially and laterally crosses over a theoretical center line located between the groove opening edges of the one of the at least one circumferential grooves.

In another aspect of the invention, at least one of the circumferential grooves may include a groove base that laterally crosses over, at various circumferential positions, a theoretical center line located between the groove opening edges of the one of the at least one circumferential grooves.

In another aspect of the invention, at least one of the circumferential grooves may include a sinusoidal groove base that laterally crosses over, at regular intervals, a theoretical center line located between the groove opening edges of the one of the at least one circumferential grooves.

In another aspect of the invention, each of the circumferential grooves may include a wavy groove base that laterally crosses over a theoretical center line located between the groove opening edges of each of the circumferential grooves.

In another aspect of the invention, the tire may further include laterally arranged rib grooves which break up at least one of the groove opening edges of at least one of the circumferential grooves.

In another aspect of the invention, the tire may further include a plurality of zigzag rib grooves arranged on at least one of the ribs.

In another aspect of the invention, the ribs may include rib grooves which repeat with a same frequency as valleys of a sinusoidal groove base of at least one of the circumferential grooves.

In another aspect of the invention, in at least one of the circumferential grooves, every other peak of one of the groove opening edges may be circumferentially aligned with valleys of a groove base of the one of the circumferential grooves.

In another aspect of the invention, in at least one of the circumferential grooves, every other valley of one of the groove opening edges may be circumferentially aligned with peaks of a groove base of the one of the circumferential grooves.

In another aspect of the invention, there is provided a tire including a tread pattern having ribs and circumferential grooves which are at least one of tapered and generally V-shaped, at least one of the circumferential grooves comprising a groove base having a wavy contour extending in a generally circumferential direction and first and second groove opening edges each having at least inwardly and outwardly curved portions.

In another aspect of the invention, the inwardly curved portions of the first groove opening edge are aligned circumferentially with outwardly curved portions of the second groove opening edge and a pitch length of the groove base is approximately twice a pitch length of at least one of the first and second groove opening edges.

In another aspect of the invention, there is provided a tire including a tread pattern having ribs and circumferential grooves which are at least one of tapered and generally V-shaped, each of the circumferential grooves including an inwardly curved groove base having at least one of a wavy contour and a sinusoidal contour and which meanders substantially axially as it travels circumferentially, and first and second groove opening edges each having inwardly and outwardly curved portions.

In another aspect of the invention, the tire further comprises a plurality of rib grooves which extend completely across or beyond at least one of the center ribs and which open out to two adjacent circumferential grooves. The rib defines a plurality of tread blocks and can be equally circumferentially spaced. The tread blocks may have the same circumferential length. The rib grooves can be substantially shallower than the circumferential grooves. The tread blocks form the contact surface of the tire can be devoid or grooves and/or sipes. Each of the blocks can have oppositely arranged edges which are curved outwardly. Each of the blocks can have oppositely arranged edges which are curved inwardly in a center portions of the block edges. Each of the blocks can have oppositely arranged edges which are curved inwardly in the center and outwardly at portions of the block edges which are arranged adjacent to the rib grooves. Each of the circumferential grooves can have curved or partially circular base. The base of the circumferential grooves can have a wavy or sinusoidal waveform which is oriented circumferentially or in the circumferential direction.

In another aspect of the invention, all of the circumferential grooves have substantially the same depth relative to the contact surface and all of the rib grooves have the same depth relative to the contact surface. The rib grooves can have a width which is a fraction of the width of the circumferential grooves as measured at the block edges. The rib grooves can have a width that is narrower in its center portion that in its end portions. The curvature of the outwardly curved block edges (measured orthogonal from a radial axis) can be less than the curvature of the base of the circumferential grooves (measured orthogonal from a radial axis). The pitch length of the outwardly curved block edges can be less than the pitch length of the wavy base portion of the circumferential grooves. The pitch length of the outwardly curved block edges can be one-half as great as the pitch length of the wavy base portion of the circumferential grooves. The circumferential groove walls can have variable angles and can be devoid of sharp edges. The base or bottom portion of each circumferential groove is rounded and/or inwardly curved and has a wavy and/or sinusoidal waveform in the circumferential direction.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 4 is an enlarged partial view of the tread pattern of the tire of FIG. 1 and illustrates the center groove;

FIG. 5D is a cross sectional view of the groove shown in FIG. 5 along line VID-VID of FIG. 5, in accordance with an embodiment of the invention;

FIG. 7 is a partial enlarged view of the tire shown in FIG. 1, in accordance with an embodiment of the invention and illustrates the first left-side groove;

DETAILED DESCRIPTION OF EMBODIMENTS OF THE INVENTION

Figure 1:
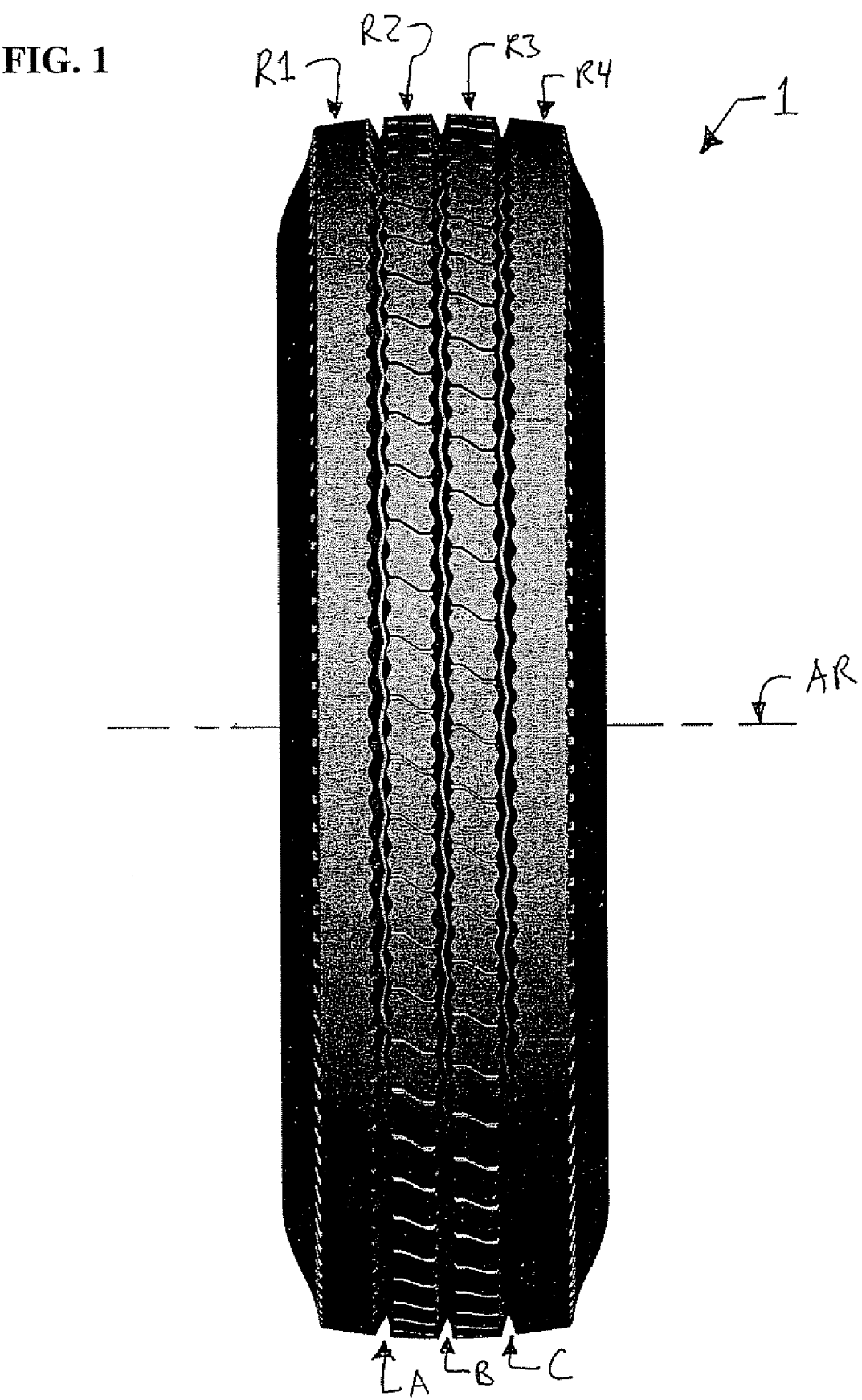
FIG. 1 is a front view of a tire in accordance with an embodiment of the invention.

The present invention is directed to a tire with a tread pattern having superior performance characteristics. In embodiments of the invention, the tread pattern includes a plurality of circumferential grooves having tapered, angled, and/or V-shaped grooves whose groove walls have a wavy pattern and/or a variable groove wall contour. The circumferential grooves are straight grooves, i.e., grooves for which the groove edges at the outer surface of the tread are disposed such that a plane which is perpendicular to the axis of rotation of the tire could be located between the groove edges without intersecting any edge of the groove. That is to say, the groove edges need not be parallel to one another, neither need the centerline of the groove be straight in order for a circumferentially extending groove to be a straight groove. The base or bottom of the circumferential grooves has a waveform or sinusoidal pattern which curves back and forth laterally around the circumference of the tire. In the design of the invention, the sidewalls are tapered with respect to a radial or equatorial plane. In use, the tread pattern of the present invention exhibits superior stone trapping resistance, groove cracking resistance, pressure distribution, as well as increased wet traction and tread mileage properties. It has also been found that the tread pattern of the present invention contributes to a decrease in road noise.

FIGS. 1-10 show a non-limiting embodiment of the tire of the invention. The tire 1 can have a non-directional tread or a directional tread. In the embodiments of FIGS. 1-10, the tread pattern includes a plurality of independent circumferential rows or ribs R1, R2, R3 and R4. Although four ribs are shown R1-R4, it should be understood that two or more ribs are also contemplated by the invention, depending on the specific application. Ribs R1 and R4 are arranged adjacent the side walls and are lateral ribs; whereas ribs R2 and R3 are center ribs. Ribs R1 and R4 also have a greater width (measured axially) than the center ribs R2 and R3. The ribs R1-R4 each include a contacting surface S which is curved outwardly in the same way as conventional tire treads.

The tire 1 can, in particular, be a radial ply pneumatic medium truck tire according to the preferred embodiment of the invention. In addition to the tread, the tire 1 has an axis of rotation AR (i.e., an axis about which the tire rotates), a pair of lateral edges, a tread width TW (see FIGS. 9-10) defined as the axial distance between lateral edges, and an equatorial plane EP (see FIG. 10). The equatorial plane EP is a plane perpendicular to the axis of rotation AR and spaced equidistant from the lateral edges. The ribs R1-R4 of the tread extend radially outwardly from the tread base 3 (see e.g., FIGS. 3C and 6A). A plurality of circumferentially continuous wide grooves A-C separate the ribs R1-R4. A plurality of narrow laterally extending rib grooves 9 (see FIG. 8) separate circumferentially adjacent traction elements or blocks 10 (see FIG. 8). The rib grooves 9 are narrow grooves separating the traction elements 10 of the two central rows or ribs R2 and R3, and are of an elongated zigzag pattern wave form. The rib grooves 9 are defined by straight opposite end portions which are circumferentially offset or non-aligned with each other and by an angled center portion (see FIG. 8). The center of each opposite end of the rib grooves 9 are circumferentially aligned with valleys V1 of the edges 6 and 7 of each rib R2 and R3. The spacing S3 (see FIG. 8) of the opposite end portions of the rib grooves 9 can be approximately one-quarter of the pitch length p1.

The grooves A-C are each defined by tapered rib walls 4 and 5 (lateral sides of the grooves). Each groove A-C has a groove base 8 and a groove opening which is defined by edges 6 and 7 (see FIGS. 3A-3D and 6A-6D). As a result of such an arrangement, the base 3 of each rib R1-R4 is wider than the contact surfaces S of each rib R1-R4. A function of the tapered rib walls 4 and 5 of the circumferential grooves A-C is to help buttress the tread elements against cornering forces generated by and placed upon the tread ribs. The tapered rib walls 4 and 5 of the tread design of this invention also vary circumferentially and/or have a variable angle contour. In this manner, the lateral sides of the grooves A-C (which are synonymous with the rib walls) define the taper from each lateral side of the groove base 8 to the groove opening according to the taper angle of the groove; as can best be seen in FIGS. 2, 3A-3D, 5 and 6A-6D. The grooves A-C, in the preferred embodiment each have a depth defined by an average and/or constant distance from the external surface S of the tread to the bottom surface of the groove base 8 or rib base 3. A median plane MP (which is parallel to the equatorial plane EP) bisects the channel formed by the respective surfaces 4 and 5 of each groove A-C (see FIGS. 3A-3D and 6A-6D). An imaginary line or arc is located on the median plane within the depth of the groove A-C. If the groove A-C runs circumferentially, then the imaginary arc will follow the curvature of the tire 1. Each groove base 8 meanders axially back and forth in a manner which crosses an imaginary center line (centrally disposed between peaks P1 of the opposite edges 6 and 7) extending through each groove A-C.

Figure 2:
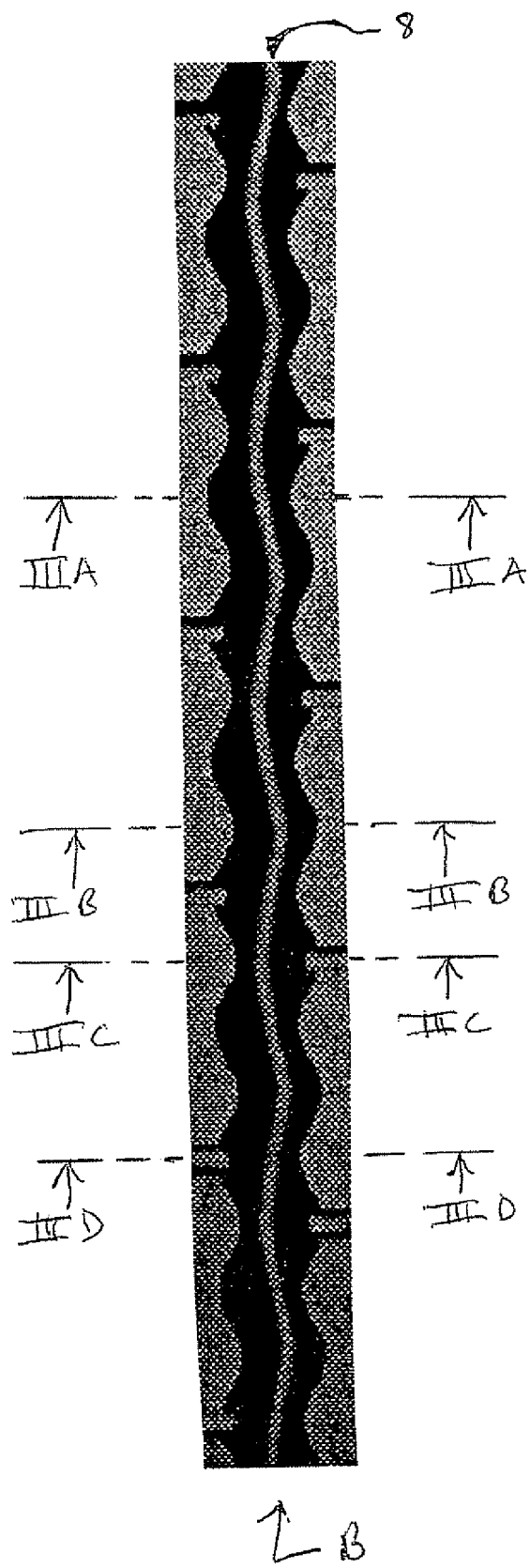
FIG. 2 is a partial view of the center tread groove shown in FIG. 1 in accordance with an embodiment of the invention.
Figure 5:
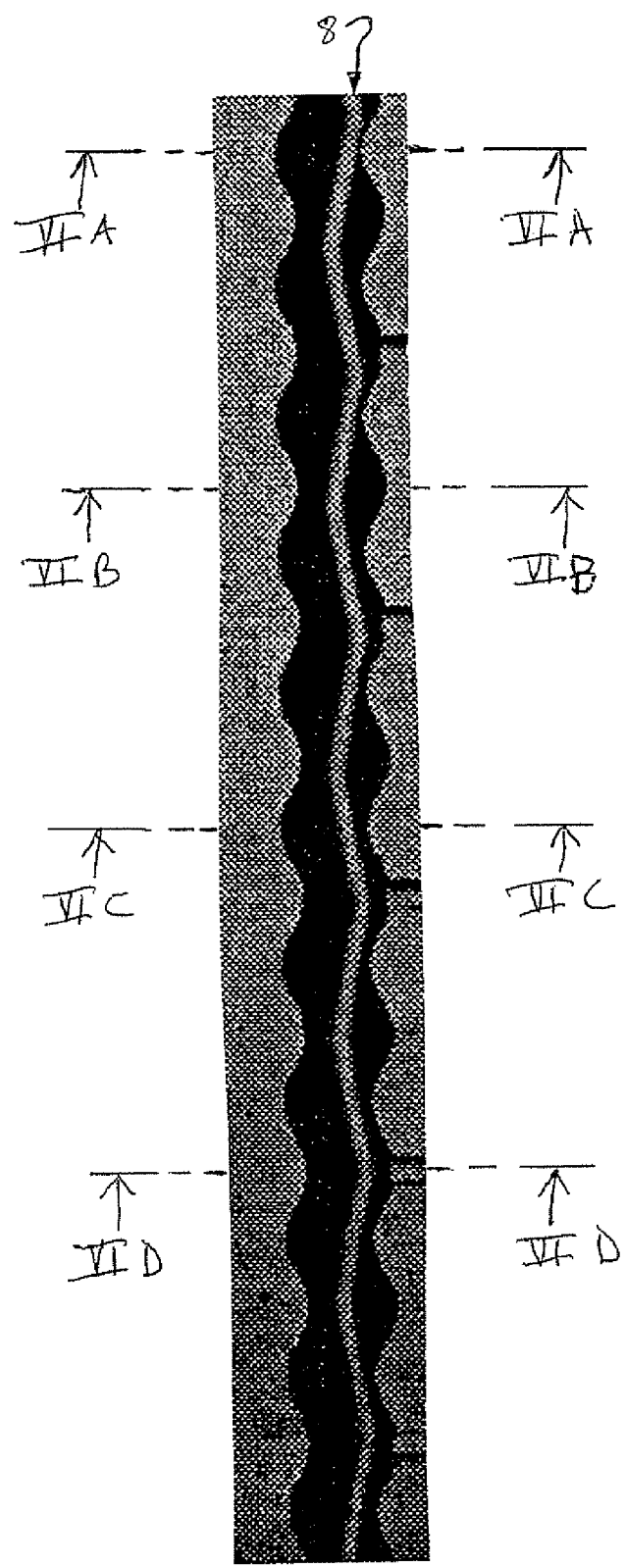
FIG. 5 is a partial view of another tread groove shown in FIG. 1 in accordance with an embodiment of the invention.

FIGS. 2 and 5 show enlarged views of the tread groove pattern shown in FIG. 1. As is also exemplified in FIG. 4, each groove A-C (only groove B is shown in FIG. 4) has a base 8 which has a sinusoidal waveform that meanders laterally and/or axially along the circumferential direction so as to define peaks P2 (high points) and valleys V2 (low points). The distance (measured circumferentially) between adjacent valleys V2 (see FIG. 4) of the groove base 8 defines a pitch length p2 and is twice the distance as the distance between adjacent valleys V1 of the groove edge 6 (or the peaks P1 of edge 7). The pitch length p2 is also defined as the circumferential length between the center points of adjacent valleys V2. Since the peaks P2 and valleys V2 of the base 8 have substantially the same radius of curvature, the pitch length p2 is also defined as the circumferential length between adjacent peaks P2. The base portions 8 of the grooves A-C constitutes the deepest portions of the tread and defines the tread base 3 (see FIGS. 3A-3D and 6A-6D).

With reference to FIGS. 1, 4, 7 and 8, each center rib R2 and R3 has lateral zigzag grooves 9 whose opposite ends have a circumferential width w1 which can be approximately 5 mm. A width of the center portion of the zigzag grooves 9 can be approximately 3 mm. With respect to groove A, the end portions of the grooves 9 of edge 7 of rib R2 are centrally disposed relative to adjacent peaks P2 of the groove base 8 of groove A. With respect to groove B, the end portions of the grooves 9 of the edge 6 of rib R2 are substantially centrally disposed relative to a center or intermediate point between an adjacent peak P2 and a valley V2 of the groove base 8 of groove B. Furthermore, the end portions of the edge 7 of rib R3 are centrally disposed relative to adjacent valleys V2 of the groove base 8 of groove B. With respect to groove C, the end portions of the grooves 9 of edge 6 are substantially centrally disposed relative to a center or intermediate point between adjacent peaks P2 and valleys V2 of the groove base 8 of groove C.

Figure 8:
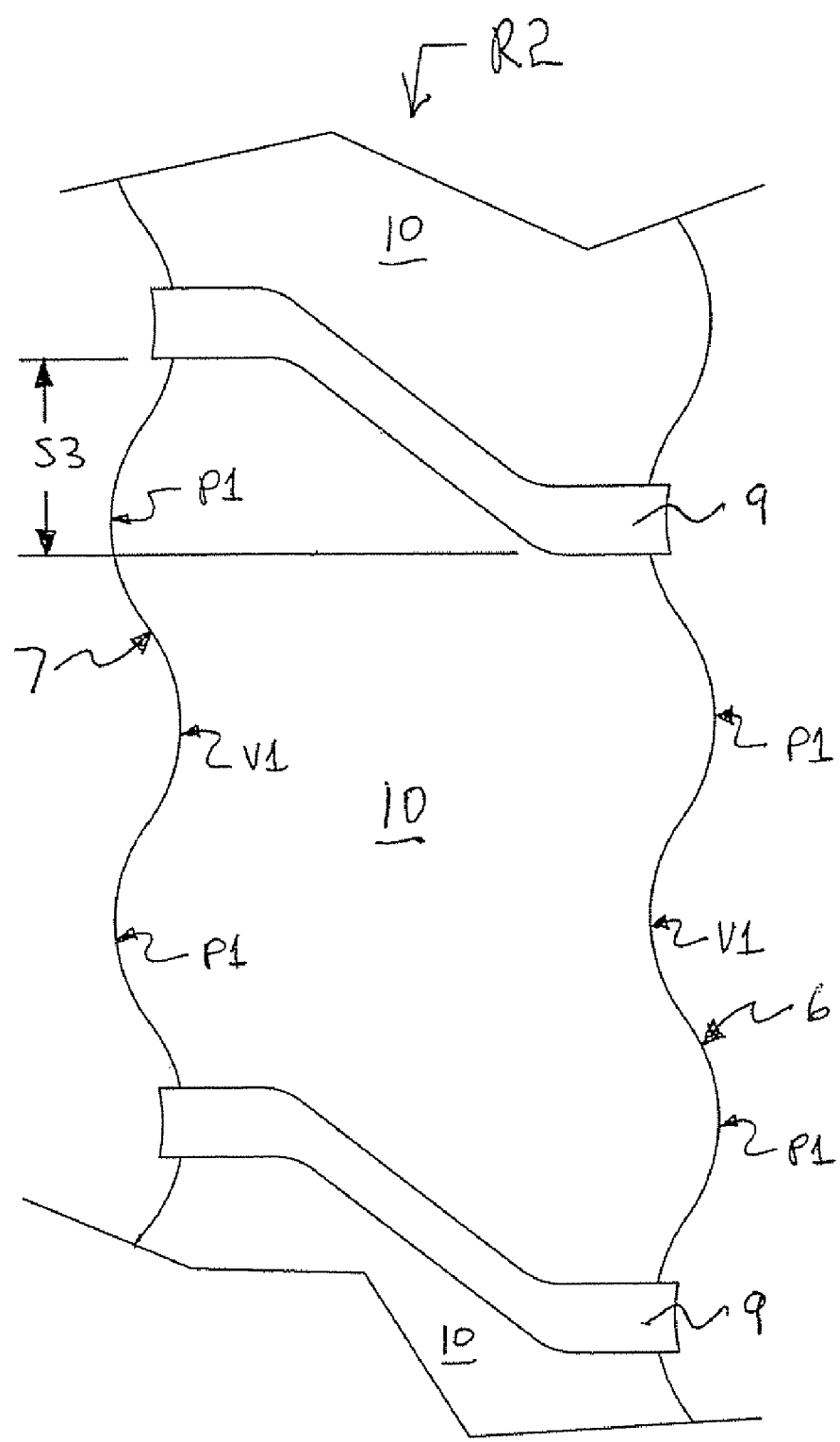
FIG. 8 is an enlarged partial view of the tread pattern of the tire of FIG. 1 and illustrates the left-side center rib.

As explained above, the lateral zigzag grooves 9 extend across each of the center ribs R2 and R3 and define tread blocks 10 (see FIG. 8). Furthermore, the grooves 9 of the ribs R2 and R3 are non-circumferentially aligned and are not in phase with each other. Instead, left end portions of the grooves 9 of edge 7 of center rib R3 are indexed by one half of the pitch length p2 relative to left the end portions of the grooves 9 of edge 7 of the rib R2. Also, as noted above, the left ends of the grooves 9 of rib R2 are substantially centrally disposed relative to the peaks P2 of the groove base 8 of groove A which extend to the right lateral side and repeat with the same regularity as these peaks P2. The left ends of the grooves 9 of rib R3 are substantially centrally disposed relative to the valleys V2 of the groove base 8 of groove B which extend to the left lateral side and repeat with the same regularity as these valleys V2.

The left ends of the lateral zigzag grooves 9 of rib R2 are substantially centrally disposed relative to every other peak P1 of the edge 6 of groove A which extend to the right lateral side and repeat with the same regularity as ever other peak P1. The right ends of the grooves 9 of rib R2 are substantially centrally disposed relative to every other valley V1 of the edge 6 of groove A which extend to the left lateral side and repeat with the same regularity as ever other valley V1. The left ends of the grooves 9 of rib R3 are substantially centrally disposed relative to every other peak P1 of the edge 6 of groove C which extend to the right lateral side and repeat with the same regularity as every other peak P1. The right ends of the grooves 9 of rib R3 are substantially centrally disposed relative to every other peak P1 of rib R4 which extend to the left lateral side and repeat with the same regularity as every other peak P1 of rib R4. The grooves 9 have, as a result of the particular design described herein, opposite ends which are not circumferentially aligned with each other.

As can be seen in FIGS. 2, 3A-3D and 4, groove B has tapered side walls 4 and 5 whose angle varies due the fact that the base 8 of the groove B has a sinusoidal waveform and because the opening edges 6 and 7 have a similar but more pronounced sinusoidal waveform. The center points of every other peak P1 (outwardly curved portions of the groove opening edge 6) are aligned and in phase with adjacent valleys V2 of the groove base 8. As is evident in FIG. 4, the radius r4 of curvature of the outwardly curved portions arranged on opposite sides of the groove base 8 have a significantly smaller radius than the radius of curvature r3 of the peaks P2 of the base 8. By way of non-limiting example, the radius r4 of the outwardly curved portions or peaks P1 of the edge 6 can be approximately 11 mm. The radius r3 of the peaks P2 (measured to the center line CL of the base 8) of the base 8 can be in the range of between approximately 15 mm and approximately 20 mm, and preferably is approximately 18 mm. The radius r5 of curvature of the valleys V1 of edge 6 also have a smaller radius than the radius of curvature r2 of the valleys V2 of the groove base 8. By way of non-limiting example, the radius r5 of the inwardly curved portions or valleys V1 of the edge 6 can be approximately 11 mm. The radius r2 of the valleys V2 (measured to the center line CL of the base 8) of the base 8 can be in the range of between approximately 15 mm and approximately 20 mm, and preferably is approximately 18 mm. The outwardly curved portions and inwardly curved portions of edge 7 of groove B have substantially the same curvature as the respective portions of edge 6 and are offset circumferentially by approximately ½ of the pitch length p1. Thus, in one non-limiting example, r2 is substantially equal to r3, and r4 is substantially equal to r5.

Figure 3A:
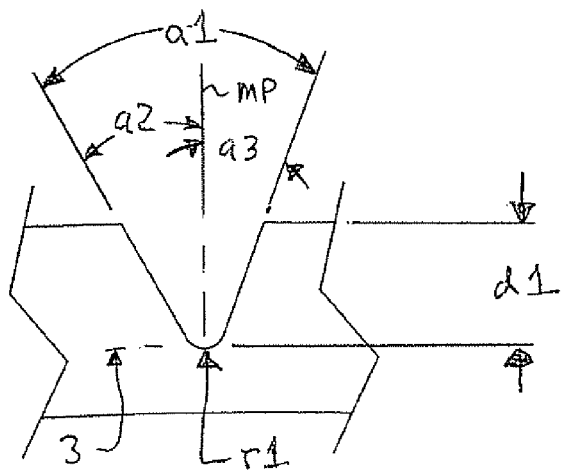
FIG. 3A is a cross sectional view of the groove shown in FIG. 2 along line IIIA-IIIA of FIG. 2, in accordance with an embodiment of the invention.
Figure 3B:
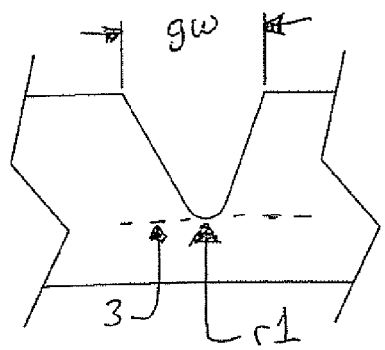
FIG. 3B is a cross sectional view of the groove shown in FIG. 2 along line IIIB-IIIB of FIG. 2, in accordance with an embodiment of the invention.
Figure 3C:
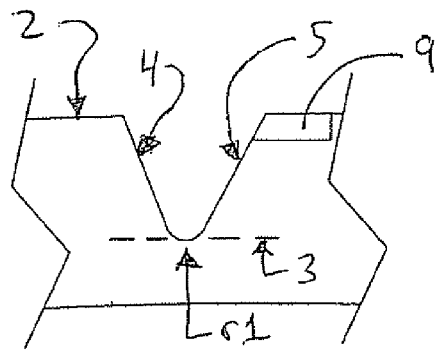
FIG. 3C is a cross sectional view of the groove shown in FIG. 2 along line IIIC-IIIC of FIG. 2, in accordance with an embodiment of the invention.
Figure 3D:
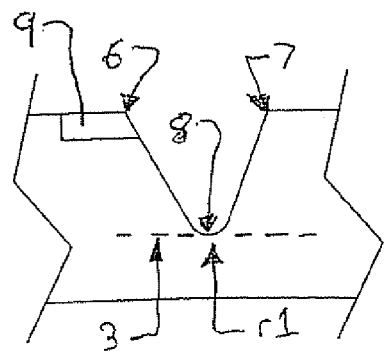
FIG. 3D is a cross sectional view of the groove shown in FIG. 2 along line IIID-IIID of FIG. 2, in accordance with an embodiment of the invention.

With reference again to FIGS. 2 and 3A-3D, it can be seen that the angles a2 and a3 of the side walls 4 and 5 of the groove B vary along the circumferential direction. FIG. 3A, for example, shows that the angle a2 of side wall 4 is greater (relative to a vertical line that is parallel to the equatorial plane EP and passing through the center of the base 8) than the angle a3 of the side wall 5 of the groove B. Because FIG. 3A is a cross-section through the mid point between adjacent peaks P2 and valleys V2 of the groove base 8, it represents the smallest angle a3 and the largest angle a2. On the other hand, the angle a2 of side wall 4 in FIG. 3C is less than (relative to a vertical line that is parallel to the equatorial plane EP and passing through the center of the base 8) the angle a3 of the side wall 5 of the groove B. FIG. 3B is a cross-section through the high point of the peak P2 of the groove base 8, the high point of the peak P1 of the edge 6, and the low point of the valley V1 of edge 7 which is in circumferential alignment with these peaks P1 and P2. Since the groove B exhibits symmetry, the angle a2 in FIG. 3A and the angle a2 in FIG. 3D will be substantially equal at increments of pitch length. Similarly, the angle a3 in FIG. 3A and the angle a3 in FIG. 3D will be substantially equal at equal increments of pitch length.

As is also evident in FIGS. 3A-3D, the groove base 8 is inwardly curved and can have a radius of approximately 2.25 mm. By way of non-limiting example, the angle a1 between the side walls 4 and 5 can be approximately 46.3 degrees. Also by way of non-limiting example, the angle a2 will vary between approximately 17.04 degrees at the locations shown in FIG. 3C to approximately 29.26 degrees at the locations shown in FIG. 3B. Additionally, by way of non-limiting example, the angle a3 will vary between approximately 17.04 degrees at the locations shown in FIG. 3D to approximately 29.26 degrees at the locations shown in FIG. 3C. The opening width "gw" of groove B as measured axially between edges 6 and 7 remains constant and can be between approximately 8 mm and approximately 20 mm, and preferably is approximately 16.5 mm. Finally, the depth "d1" of the groove B as measured from the edge 7 to the base bottom of the groove base 8 (which corresponds to the rib base 3) can be approximately 18.65 mm.

As can be seen in FIGS. 5, 6A-6D and 7, groove A also has tapered side walls 4 and 5 whose angle varies due the fact that the groove base 8 of the groove A, like groove B, has a sinusoidal waveform and because the opening edges 6 and 7 have a similar but more pronounced sinusoidal waveform. The center points of every other peak P1 or outwardly curved portion of the edge 6 are aligned and in phase with the valleys V2 of the groove base 8. As is evident in FIG. 7, the radius r4 of curvature of the outwardly curved portions arranged on the edge 6 have a smaller radius than the radius of curvature r3 of the peaks P2 of the groove base 8. By way of non-limiting example, the radius r4 of the outwardly curved portions of the edge 6 can be approximately 11 mm. The radius r3 of the peaks P2 (measured to the center line CL of the groove base 8) of the base 8 can be in the range of between approximately 15 mm and approximately 20 mm, and preferably is approximately 18 mm. The radius r5 of curvature of the valleys V1 of edge 6 also have a smaller radius than the radius of curvature r2 of the valleys V2 of the groove base 8. By way of non-limiting example, the radius r5 of the inwardly curved portions of the edge 6 can be approximately 11 mm. The radius r2 of the valleys V2 (measured to the center line CL of the groove base 8) of the groove base 8 can be in the range of between approximately 15 mm and approximately 20 mm, and preferably is approximately 18 mm. The outwardly curved portions and inwardly curved portions of edge 7 of groove A have substantially the same curvature as the respective portions of edge 6 and are offset circumferentially by approximately ½ of the pitch length p1. Thus, in one non-limiting example, r2 is substantially equal to r3 and r4 is substantially equal to r5.

Figure 6A:
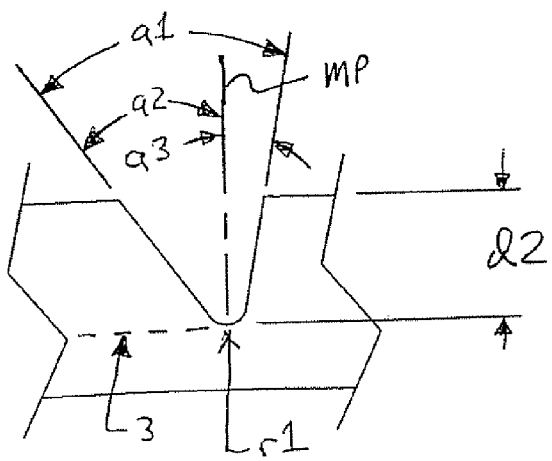
FIG. 6A is a cross sectional view of the groove shown in FIG. 5 along line VIA-VIA of FIG. 5, in accordance with an embodiment of the invention.
Figure 6B:
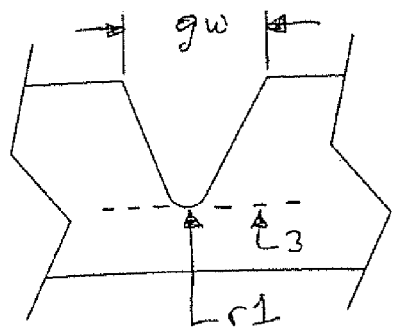
FIG. 6B is a cross sectional view of the groove shown in FIG. 5 along line VIB-VIB of FIG. 5, in accordance with an embodiment of the invention.
Figure 6C:
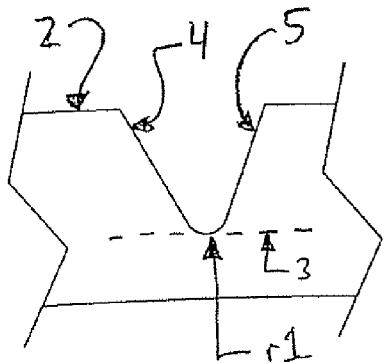
FIG. 6C is a cross sectional view of the groove shown in FIG. 5 along line VIC-VIC of FIG. 5, in accordance with an embodiment of the invention.
Figure 6D:
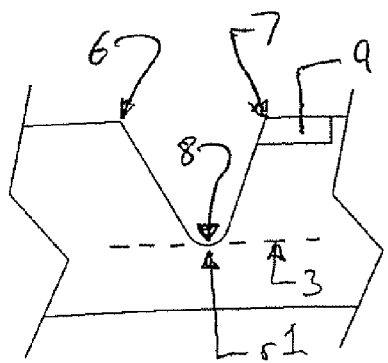

With reference again to FIGS. 5 and 6A-6D, it can be seen that the angles a2 and a3 of the side walls 4 and 5 of the groove A, like those of groove B, vary along the circumferential direction. FIG. 6A, for example, shows that the angle a2 of side wall 4 is greater (relative to a vertical line that is parallel to the equatorial plane EP and passing through the center of the base 8) than the angle a3 of the side wall 5 of the groove A. FIG. 6D is a cross-section through the high point of the peak P2 of the groove base 8. The angle a2 of side wall 4 in FIG. 6B is less than (relative to a vertical line that is parallel to the equatorial plane EP and passing through the center of the base 8) than the angle a3 of the side wall 5 of the groove A. Because FIG. 6B is a cross-section through the low point of the valley V2 of the groove base 8, it represents the smallest angle a2 and the largest angle a3. Since the groove A exhibits symmetry, the angle a2 in FIG. 6A and the angle a3 in FIG. 6B will be substantially equal. Similarly, the angle a3 in FIG. 6A and the angle a3 in FIG. 6C will be substantially equal.

As is also evident in FIGS. 6A-6D, the groove base 8 is inwardly curved and can have a radius of approximately 2.25 mm. By way of non-limiting example, the angle a1 between the side walls 4 and 5 can be approximately 46.3 degrees. Also by way of non-limiting example, the angle a2 will vary between approximately 17.04 degrees at locations shown in FIG. 6B to approximately 29.26 degrees at the locations shown in FIG. 6D. Additionally, by way of non-limiting example, the angle a3 will vary between 17.04 degrees at the locations shown in FIGS. 6A and 6C to approximately 29.26 degrees at the locations shown in FIG. 6B. The opening width "gw" of groove A, as measured axially between the edges 6 and 7 remains constant and can be between approximately 8 mm and approximately 20 mm, and is preferably approximately 16.5 mm. Finally, the depth "d2" of the groove A as measured from the edge 7 to the base bottom of the groove base 8 (which corresponds to the rib base 3) can be approximately 18.65 mm.

As explained above, angles a2 and a3 of the circumferential grooves A-C vary continuously in the circumferential direction between minimum and maximum angle values determined by the groove depth, opening width and base width and axial position of the groove base 8 center line CL. The position of the center line CL also changes continuously in the circumferential direction relative to an imaginary center line between the groove opening edges 6 and 7 of each groove A-C. Although the details of grooves A and B have been discussed herein in detail, because grooves A and C have substantially the same configuration, the details of groove A would also apply to groove C. In particular, the details of grooves A and C would substantially correspond.

Figure 9:
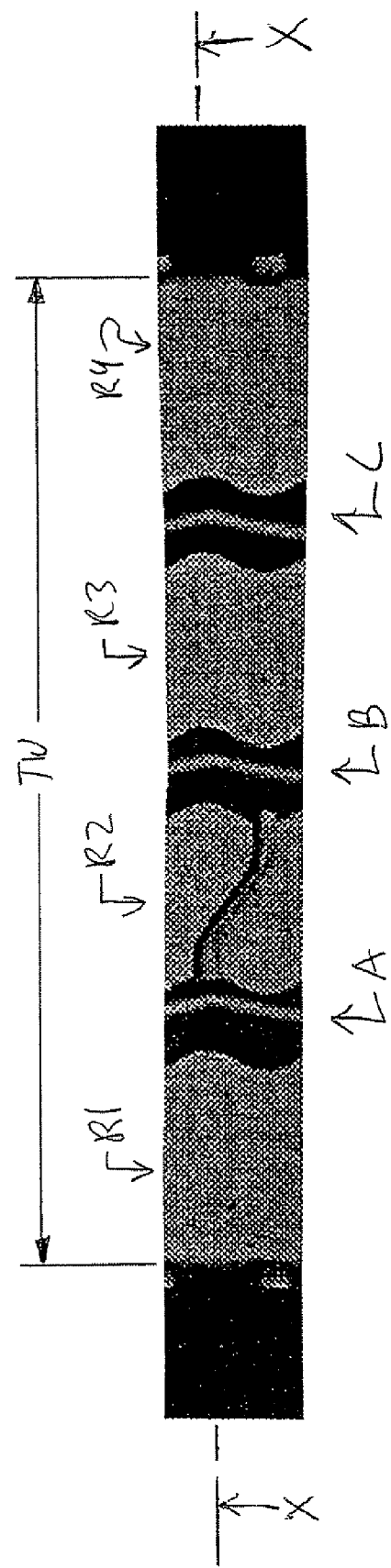
FIG. 9 is a partial enlarged view of the tire shown in FIG. 1, in accordance with an embodiment of the invention.
Figure 10:
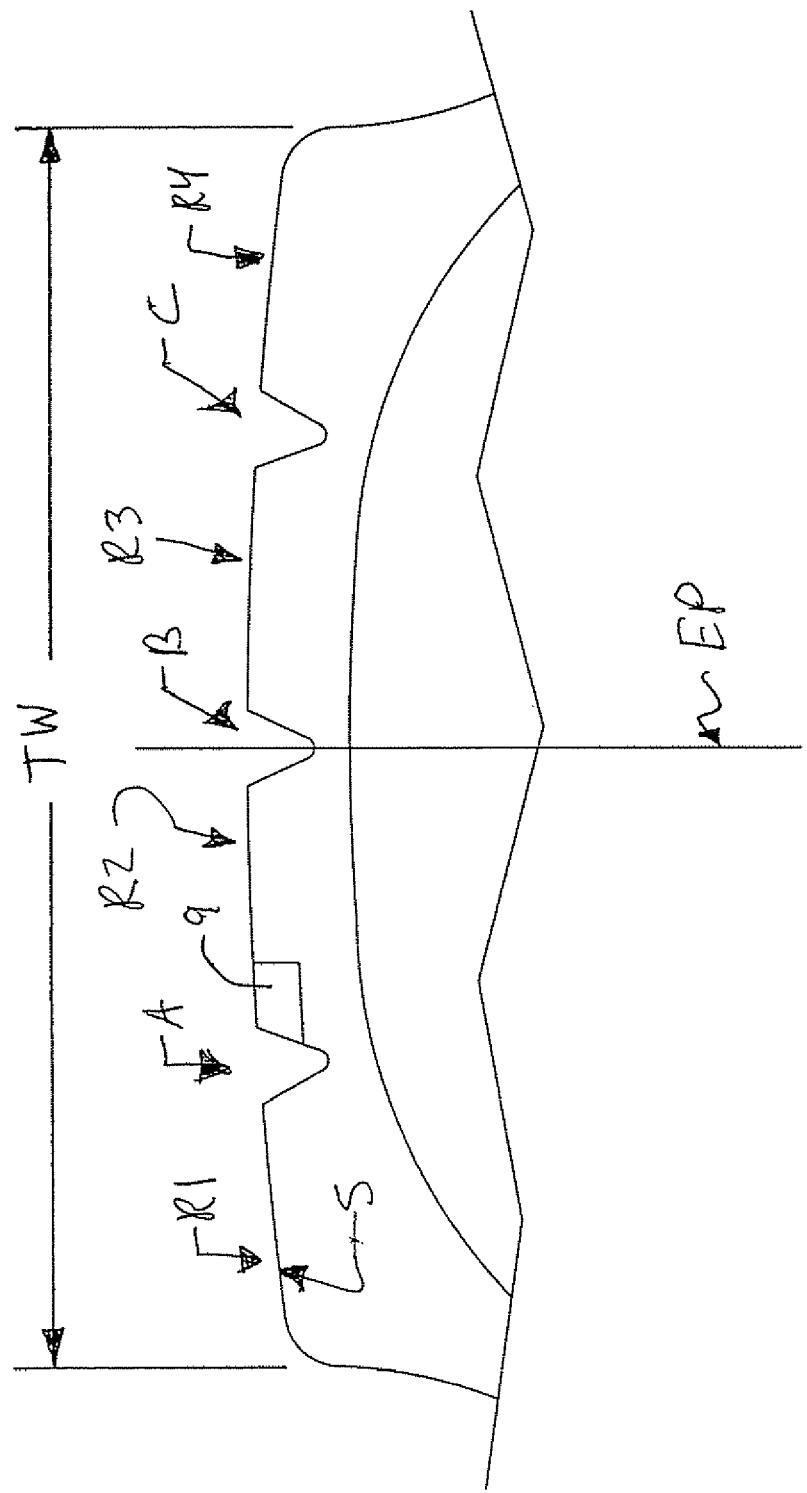
FIG. 10 is a cross sectional view of the tread pattern along line X-X of FIG. 9, in accordance with an embodiment of the invention.

Referring to FIGS. 9 and 10, it can be seen that the grooves A-C are essentially equally spaced from each other and have a V-shaped configuration. By way of non-limiting example, the tread width TW can be approximately 220 mm. The groove base 8 radius r1 (see FIGS. 3A-3D and 6A-6D) can be the same for each of the grooves A-C and can preferably be approximately 2.25 mm, but may also range between approximately 1 mm and 3 mm. The widths "gw" of the groove openings can also be the same for each of the grooves A-C and can depend on such variables as, for example, the depth of the groove. It should be understood by those of skill in the art that the above examples are but one non-limiting illustration of the dimensions contemplated by the present invention, and that the above dimensions can vary in accordance with other design specifications.

Because of the variable groove wall contour and/or sinusoidal configuration of the base 8 and groove opening edges 6 and 7, there is reduced likelihood that stones or other debris will be trapped in the grooves A-C. That is, using the tread design of the present invention, an angle is constantly changing on the sides of the grooves A-C during roll of the footprint (e.g., rotating and flanking angles) thus contributing significantly to the release stones and/or other debris. Additionally, the varying wall contour and rounded edges improves the pressure distribution of the tire (due to the elimination of any sharp angles) which, in turn, results in: (i) superior tread wear properties; (ii) superior wet traction; (iii) reduced noise; and (iv) longer tread mileage.

It has also been found that the varying wall contour and/or rounded edges of the present invention reduces stress points in the tire due to the fact that forces cannot conjugate in one area, e.g., at any point or corner. Instead, by using the tread pattern of the present invention, the varying wall contour and rounded corners allows forces to travel upwards on the ribs R1-R4, thus eliminating places for forces to collect. This leads to improved groove cracking resistance. As one of ordinary skill in the art would recognize, the substantial reduction or elimination of stresses is due mainly to the elimination of any sharp edges or angles in the tire pattern design.

From a manufacturing standpoint, the material to produce the tread patterns should flow better into the mold since there are no sharp corners. Thus, the material does not have to squeeze into corners, but instead flows smoothly around rounded corners. This results in better material (e.g., rubber) flow in the mold during manufacturing, thus resulting in fewer defects.

The disclosure of U.S. patent application Ser. No. 11/320,849 filed on Dec. 30, 2005 to Daniel S. MATHEWS entitled TIRE WITH TREAD PATTERN is hereby expressly incorporated by reference in its entirety.

The foregoing examples have been provided for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. The present invention is not intended to be limited to the particulars disclosed herein; rather, the present invention extends to all functionally equivalent structures, methods and uses, such as are within the scope of the appended claims.

What is claimed is:

1. A tire comprising a tread pattern having ribs and circumferential grooves which are at least one of tapered and generally V-shaped, wherein walls of each of the circumferential grooves have a generally sinusoidal contour extending in a generally circumferential direction, and wherein groove opening edges of each of the circumferential grooves have a generally sinusoidal configuration, and wherein at least one of the circumferential grooves comprises a generally sinusoidal groove base, a pitch length of the sinusoidal groove base being at least one of twice a pitch length of the sinusoidal configuration of at least one of the groove opening edges and greater than a pitch length of the generally sinusoidal configuration of at least one of the groove opening edges.

2. A tire comprising a tread pattern having ribs and circumferential grooves which are at least one of tapered and generally V-shaped, at least one of the circumferential grooves comprising a groove base having a wavy contour extending in a generally circumferential direction and first and second groove opening edges each having at least inwardly and outwardly curved portions, wherein the inwardly curved portions of the first groove opening edge are aligned circumferentially with outwardly curved portions of the second groove opening edge and wherein a pitch length of the groove base is approximately twice a pitch length of at least one of the first and second groove opening edges.

* * * * *